United States Patent
Morley

[11] Patent Number: 5,341,403
[45] Date of Patent: Aug. 23, 1994

[54] MEANS TO AVOID DATA DISTORTION IN CLOCK-SYNCHRONIZED SIGNAL SAMPLING

[75] Inventor: Sean Morley, Limerick, Ireland

[73] Assignee: Analog Devices, Incorporated, Norwood, Mass.

[21] Appl. No.: 826,398

[22] Filed: Jan. 27, 1992

[51] Int. Cl.⁵ .................................... H04L 7/00
[52] U.S. Cl. ........................ 375/106; 375/95; 375/111; 340/825.2
[58] Field of Search ............. 375/95, 106, 111, 118; 340/825.2

[56] References Cited

U.S. PATENT DOCUMENTS

| | | | |
|---|---|---|---|
| Re 33,665 | 8/1991 | Ogawa | 375/106 X |
| 4,694,294 | 9/1987 | Denhez et al. | 375/106 X |
| 4,716,528 | 12/1987 | Wight | 375/106 X |
| 4,782,499 | 11/1988 | Clendening | 375/118 X |
| 5,018,168 | 5/1991 | Matsuoka | 375/106 |
| 5,056,120 | 10/1991 | Taniguchi et al. | 375/118 |
| 5,099,477 | 5/1992 | Taniguchi et al. | 375/118 X |

*Primary Examiner*—Stephen Chin
*Assistant Examiner*—Bryan Webster
*Attorney, Agent, or Firm*—Parmelee, Bollinger & Bramblett

[57] ABSTRACT

Signal-sampling apparatus wherein information signals are directed to a register under the control of first clock pulses and are latched into the register under the control of second clock pulses. A calibrator monitors the timing of the first and second clock pulses to determine if they are so close together that data signals subsequently output from the register will be distorted so as to cause errors in downstream devices. If such condition is found, the calibrator inverts the phase of the second clock pulses to assure proper time spacing to avoid data corruption.

8 Claims, 6 Drawing Sheets

MEANS TO AVOID DATA DISTORTION IN CLOCK-SYNCHRONIZED SIGNAL SAMPLING

BACKGROUND OF THE INVENTION

1. Field of the Invention

This invention relates to clock-pulse-activated sampling and/or storage of signal information. More particularly, this invention relates to means for preventing distortion of the transferred data when the data input can change at a time which is close to the sampling time.

2. Description of the Prior Art

It is known that data alteration can occur in a clock-controlled signal sampling system if a change in input signal occurs too close in time to the active clock edge. The data alteration is caused by an abnormally long propagation delay within a storage device (such as a register) before the output of the storage data becomes valid; such abnormal propagation delay in turn is caused by meta-stable behavior within the device. The distortion may appear as an error in the device output (e.g. a zero rather than a one), or it may appear as an undue delay in the output data becoming valid.

Such data distortion can occur both for signal transitions preceding the clock edge as well as for transitions following the clock edge. That is, there is a timing "window" around the active clock edge within which a change in input signal will have a finite probability of causing an error in either stored data, or the data transferred to a downstream device.

FIG. 1 shows an exemplary application where such data distortion (sometimes referred to as data corruption) can occur. The apparatus of FIG. 1 is based on a prior art video sub-system such as shown in U.S. patent application Ser. No. 665,309 filed Mar. 6, 1991 by Denis O'Mahony (see for example FIG. 10 thereof). In such a system, the video signals for controlling a CRT are stored in a Frame Store 20 for subsequent transfer to a video RAM-DAC 22 forming part of an integrated-circuit (IC) chip. The data (I) is transferred from the Frame Store to a first flip-flop register 24 where it is clocked in by a signal identified as CLK1. This clock signal is developed by the clock logic 26 associated with the Frame Store 20 as part of the graphics board. The initially stored data then is transferred (Q) to a second flip-flop register 28 where it is clocked in by CLK2. This clock signal is derived from a pulse-frequency divider 30 activated by an external oscillator 32. The output of the divider also is directed to the clock logic 26 and is used among other things to generate CLK1.

Referring now also to FIG. 2, there is shown a timing diagram for CLKS 1 and 2, the signal information I and the signal Q at the output of the first flip-flop register 24. If the transition 34 in the signal Q occurs at any time falling within the shaded region 36 (covering a period from just before to just after CLK2), there will be a finite probability that the data delivered downstream by the second register 28 will be in error, or will be so delayed as to cause an error to occur in a downstream device.

As indicated in FIG. 2, the time period represented by the shaded area 36 consists of a first time Tsu preceding CLK2, and a second time Th following CLK2. Tsu is known as the "setup time", and Th is known as the "hold time". Tsu and Th are not necessarily equal. Any input signal transition occurring in either Tsu or Th will result in an abnormally extended propagation delay through the register, thereby possibly causing an error in a downstream device (e.g., RAM-DAC 22). If an input transition occurs before the setup time, or after the hold time, the propagation delay to the output will be normal, and the stored data will be valid.

The relationship between CLK1 and the input data (I) is such that the setup and hold times of the inputs to the first register 24 are satisfied. However, the delay between CLK1 and CLK2 is dependent on the actual circuit implementation of the clock logic 26. From the timing diagram of FIG. 2, there is a range of phase delay between CLK1 and CLK2 which will allow the input data to be synchronized and clocked through the RAM-DAC 22. However, there also is a range of phase delay between CLK1 and CLK2 where data corruption will occur.

Because the clock logic 26 is required to meet various timing requirements unrelated to the RAM-DAC 22, it is difficult for the graphics board designer to establish a proper phase delay between CLK1 and CLK2 such as to avoid errors due to distortion of the data stored in or output from the second register 28. This difficulty increases as the operating frequency increases. However, it has been found, in accordance with the present invention, to be possible to provide automatic control of the phase relationship between CLK1 and CLK2 after the graphics board has been assembled with the RAM-DAC 22 so as to assure proper time spacing between the CLK1 and CLK2 clock pulses and thereby avoid such data distortion.

SUMMARY OF THE INVENTION

In a preferred embodiment of the invention, to be described hereinbelow in detail, a data transfer system is provided wherein the times of incidence of the active edge of two synchronous clocks (CLK1 and CLK2) are monitored by a calibrator unit upon software command. This calibrator determines whether a signal transition controlled by a first set of clock pulses CLK1 would occur so close to the active edge of a second set of clock pulses CLK2 used for loading a register as to cause data distortion at that register. When such a too-close condition is detected (that is, when CLK1 occurs within a "forbidden window" about CLK2), the calibrator automatically alters the timing of one of the clock pulses (preferably CLK2) to a state where the CLK1-controlled signal transition cannot occur during the setup and hold time for the register. Thus errors due to distortion of the data signals can be avoided. In the particular embodiment described, the timing of CLK2 is altered by inverting its phase.

Other objects, aspects and advantages of the invention will in part be pointed out in, and in part apparent from, the following description of a preferred embodiment of the invention, considered together with the accompanying drawings.

DESCRIPTION OF A PREFERRED EMBODIMENT

Figure 1:
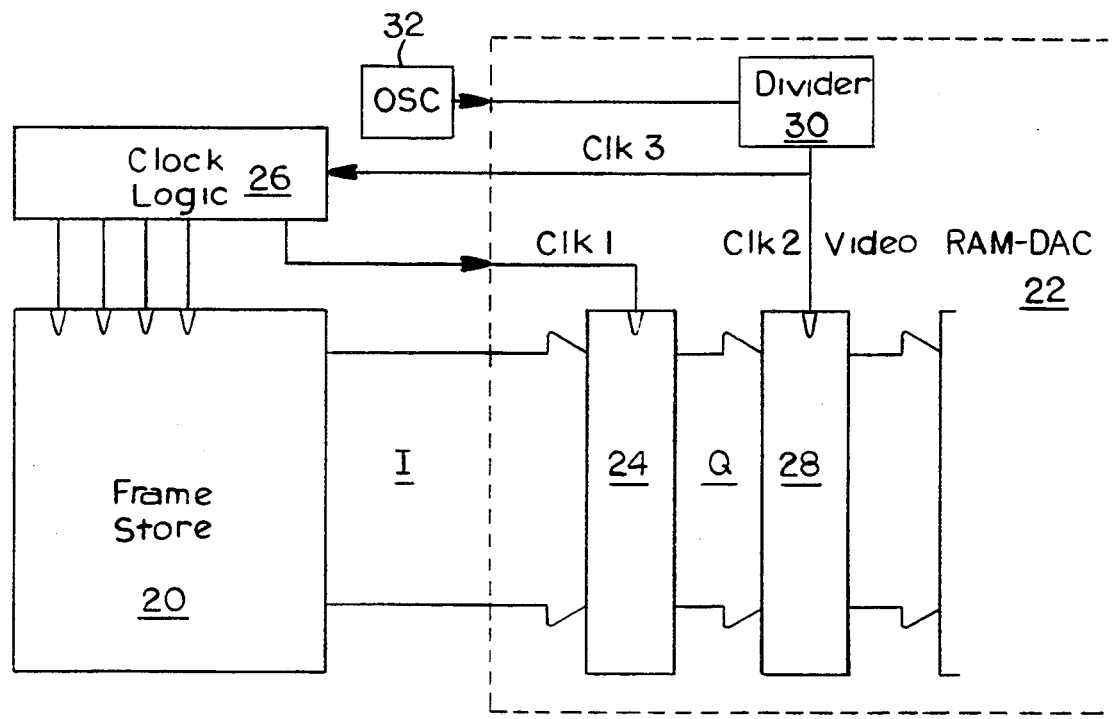
FIG. 1 is a schematic diagram, in block format, of a prior art type of video sub-system.
Figure 2:
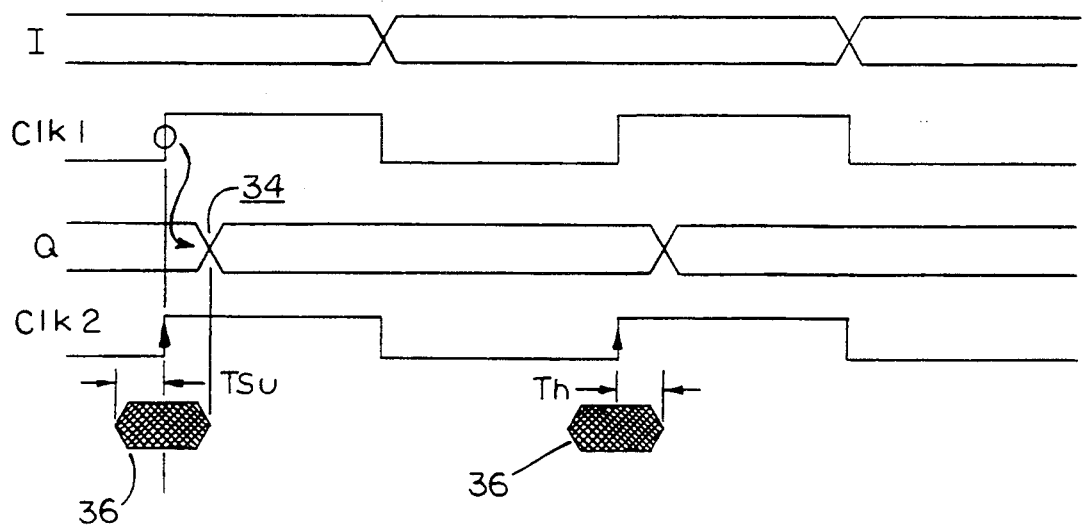
FIG. 2 is a timing diagram showing the relationship between certain signals in the FIG. 1 apparatus.
Figure 3:
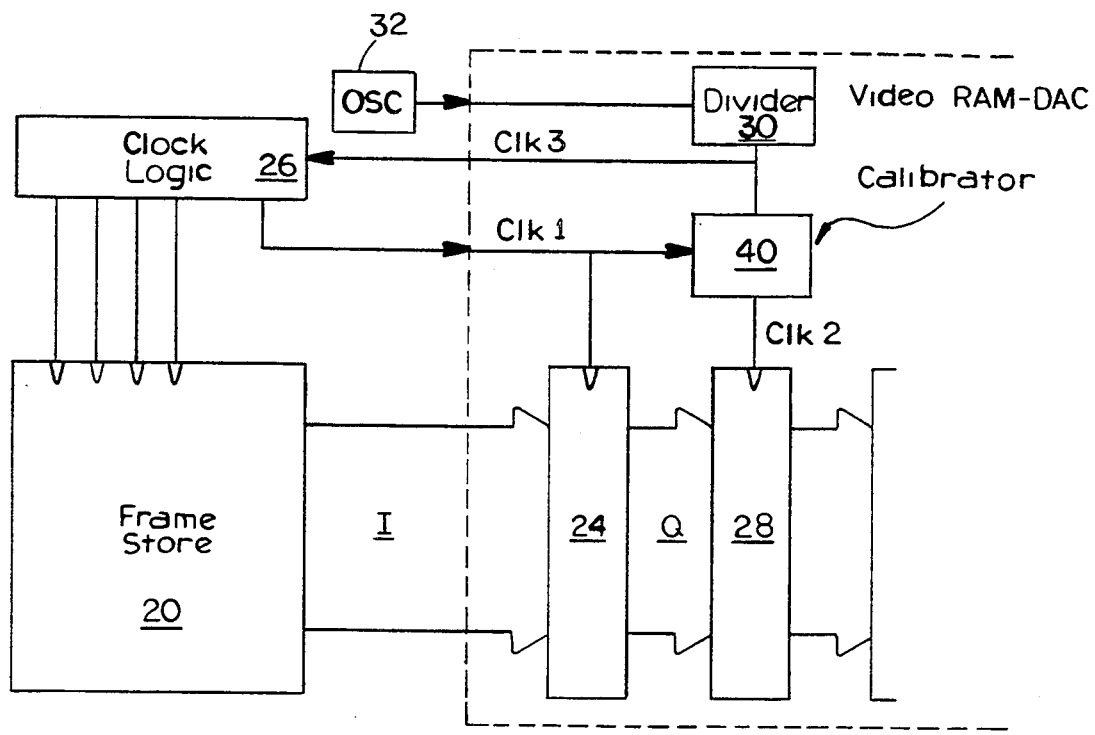
FIG. 3 is a schematic diagram illustrating the apparatus of FIG. 1 modified to incorporate the present invention.

Referring now to FIG. 3, the overall functioning of the apparatus shown there is generally the same as that of FIG. 1 as described above in the prior art section. However, FIG. 3 additionally includes a calibrator 40 which monitors the phase relationship between CLK1 and CLK2, and automatically controls the timing of CLK2 in such a way that no errors due to distortion of data transferred to register 28 can occur as a result of an incorrect phase relationship between CLK1 and CLK2.

Figure 4:
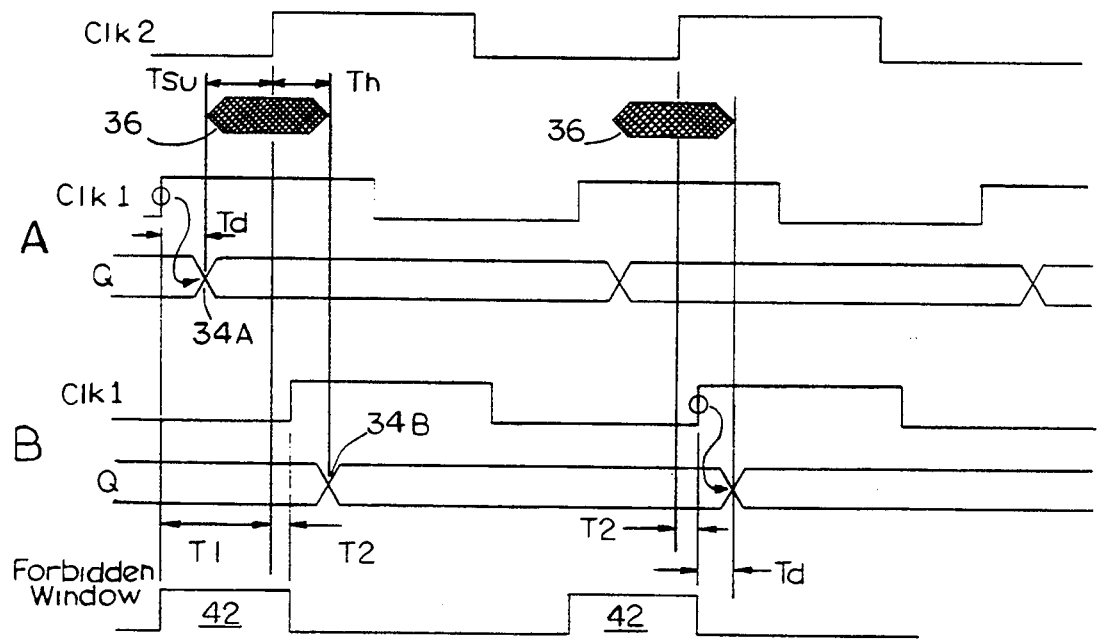
FIG. 4 is a timing diagram reflecting aspects of the operation of the apparatus of FIG. 3.

The timing diagram of FIG. 4 illustrates the time relationships between CLK1, CLK2 and a "forbidden window" 42 for different conditions A and B. The forbidden window represents a time period (not a signal) during which the rising edge of CLK1 should not occur, for otherwise data corruption can occur. In case A, CLK1 occurs just before the forbidden window, whereas in case B, CLK1 occurs just after the forbidden window. Thus data transitions 34A and 34B for both cases A and B meet the setup and hold time requirements for the register, so that phase-induced distortion of data cannot occur.

The forbidden window 42 has a duration T1+T2 which is equal to the combined setup and hold times Tsu+Th for the flip-flops of register 28. The leading edge of the window precedes the start of the setup time Tsu by a time period Td, the inherent time delay between CLK1 and the signal transition 34A or B. If CLK1 occurs at any time during the forbidden window, the data transition will occur during either the setup or the hold time Tsu or Th, thus resulting in a finite probability of data corruption.

It will be seen that the initial portion T1 of the forbidden window 42 (i.e., the portion preceding CLK2) will be equal to Tsu+Td, where Td is the propagation delay from CLK1 to the signal transition 34A or B. Thus, when CLK1 occurs before the forbidden window 42 (case A), the set up time requirement for CLK2 will just be met; that is, the data transition 34A occurs at a time which is before the start of the setup time Tsu for CLK2. The second time period T2 of the forbidden window is equal to Th−Td. Thus, when CLK1 occurs after the forbidden window (case B), the hold time requirement for CLK2 will just be met; that is, the data transition 34B will occur at a time which is after the end of the hold time Th for CLK2.

Figure 5:
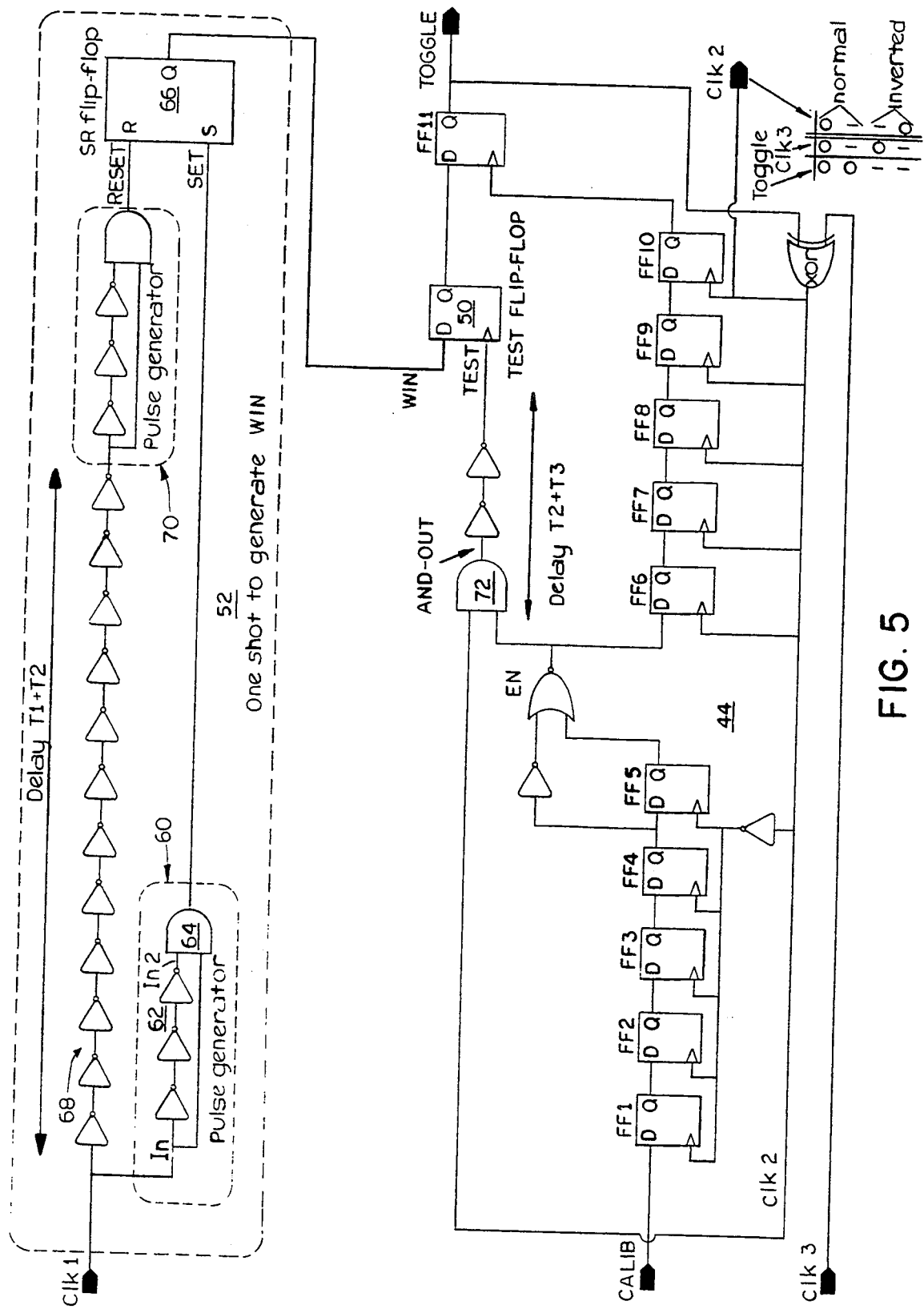
FIG. 5 is a block diagram showing details of the arrangement of the calibrator incorporated in the apparatus of FIG. 3.

FIG. 5 presents a block diagram showing details of the calibrator 40 which monitors the time relationship between CLK1 and CLK2 to determine if CLK1 is too close to CLK2. If it is, the calibrator automatically alters that relationship to separate the pulses by a time sufficient to insure that no data distortion can occur. More specifically, if CLK1 is too close to CLK2, an output flip-flop FF11 will go high to produce a "toggle" signal for a phase correction circuit generally indicated at 44 (in the lower right-hand corner of FIG. 5). This circuit includes an XOR logic unit through which the clock pulses CLK3 pass to produce CLK2 pulses. When the toggle output of FF11 is low, the output CLK2 pulses will be the same phase as the CLK3 pulses at the input, as indicated by the truth table presented next to the circuit 44. However, if the toggle output of FF11 goes high, the CLK2 pulses will emerge inverted relative to the CLK3 pulses, thereby assuring that the rising edges of the CLK1 and the inverted CLK2 pulses will be sufficiently far apart to avoid data distortion.

Figure 6:
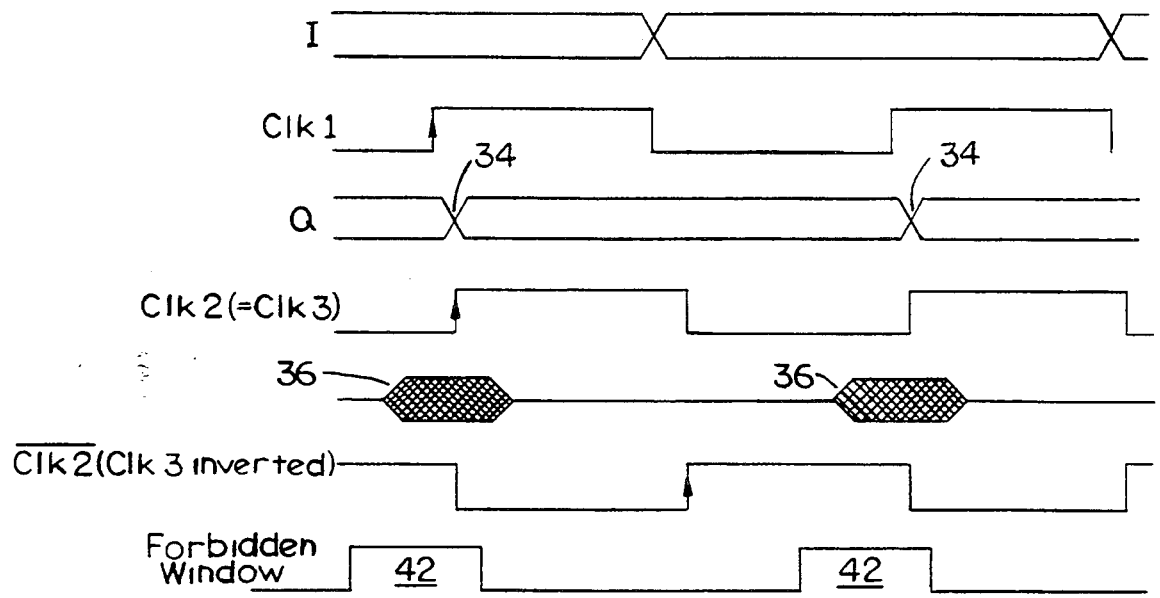
FIG. 6 is a timing diagram illustrating the relationships between the forbidden window and the clock pulses.

These relationships are illustrated more fully in FIG. 6 which shows a condition where the rising edge of CLK1 occurs during the forbidden window 42. Thus the data transition 34 occurs during the shaded time zone 36 (representing the combined setup and hold times Tsu and Th about CLK2). Initially, as shown in FIG. 6, CLK2 is the same phase as CLK3. However, when the correction circuit 44 inverts CLK3 to produce CLK2, its rising edge is moved away from the rising edge of CLK1. Thus the data transition 34 will occur outside of the shaded area 36 because the latter will move to a new position encompassing the rising edge of CLK2 at its new position. The forbidden window similarly will move to a new position, away from the rising edge of CLK1.

Figure 7:
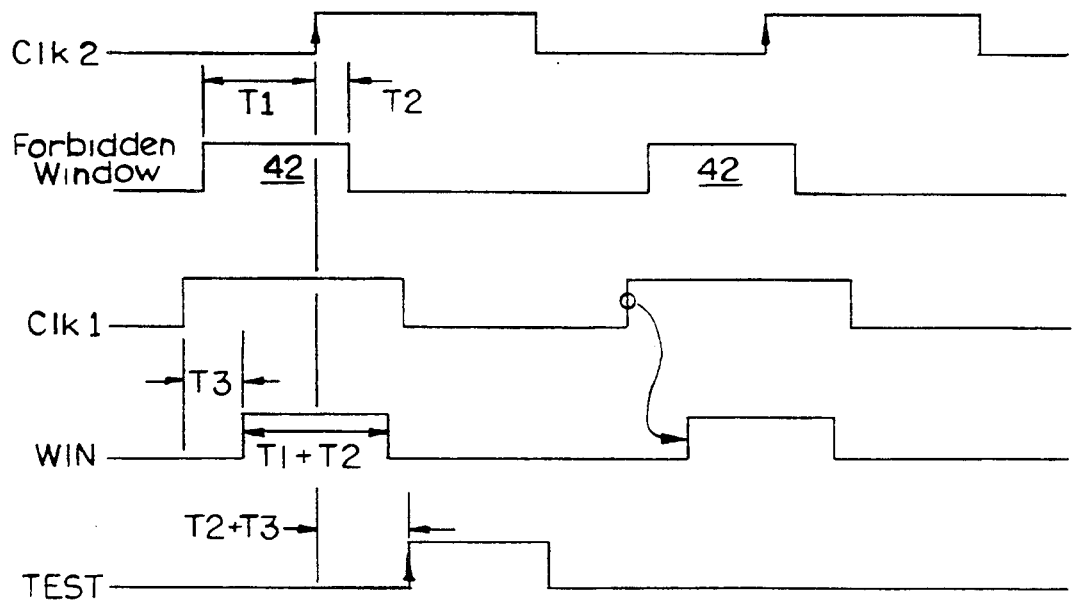
FIG. 7 is a timing diagram illustrating the time relationships between the clock pulses and certain signals developed by the calibrator of FIG. 5.

Referring now also to FIG. 7, in order to carry out the functions described above, the calibrator 40 develops two signals WIN and TEST which are directed to a Test flip-flop 50. This flip-flop compares the timing of WIN and TEST to determine whether CLK1 is so close to CLK2 that data corruption can occur.

WIN is a pulse having a duration equal to that of the forbidden window 42 (T1+T2). It is generated by a one-shot 52 (FIG. 5) triggered by the active edge of CLK1, after a delay T3 inherent in the circuitry shown. The TEST signal is a pulse triggered by the active edge of CLK2 but with its rising edge delayed by T2+T3. TEST is the clock input to the Test flip-flop 50, and WIN is the D input to that flip-flop. If TEST is initiated while WIN is high, the flip-flop output goes high, and that high output (ultimately) drives the toggle output of FF11 high.

In the actual example shown in FIG. 7, CLK1 precedes the leading edge of the forbidden window 42, so no high toggle output will be generated. However, if the time of occurrence of CLK1 is advanced (moved forward) until it falls within the time period T1 of the forbidden window, then the WIN pulse (having a duration of T1+T2, delayed by T3 after CLK1) will be high when TEST goes high, because the TEST rising edge occurs at a time T2+T3 after CLK2. Thus, toggle will go high to invert the phase of CLK2.

Figure 8:
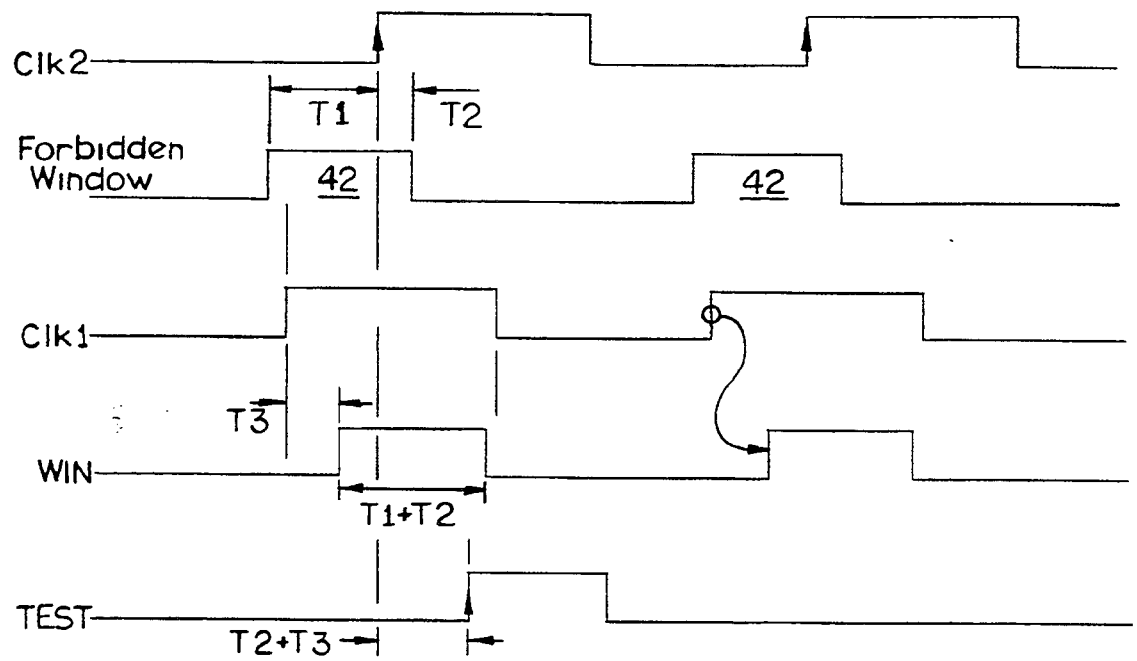
FIG. 8 is a timing diagram showing the signals of FIG. 7 when CLK1 is just inside the forbidden window, adjacent its leading edge.
Figure 9:
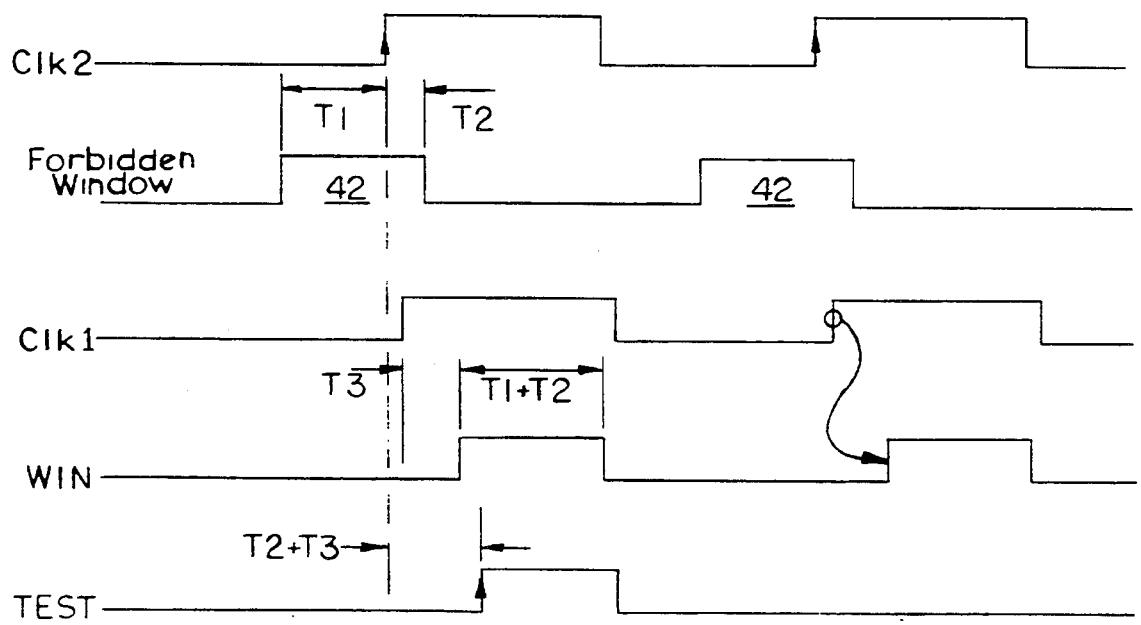
FIG. 9 is a timing diagram showing the signals of FIG. 7 when CLK1 is just inside the forbidden window, adjacent its trailing edge.

This result is illustrated in FIG. 8 which is like FIG. 7 except that the rising edge of CLK1 is just within the forbidden window 42. In this case, the rising edge of TEST will be inside of the high region of WIN, adjacent its trailing edge, so the output of the Test flip-flop 50 will go high. This will produce a high toggle signal at the output of FF11 and thereby invert the phase of CLK2. FIG. 9 is like FIG. 8, with the rising edge of CLK1 inside of the forbidden window, but in this case adjacent its trailing edge. Again, the rising edge of TEST will be just inside of the WIN pulse, but this time near its leading edge. Again, the test flip-flop will go high to produce a high toggle signal to invert the phase of CLK2.

Figure 10:
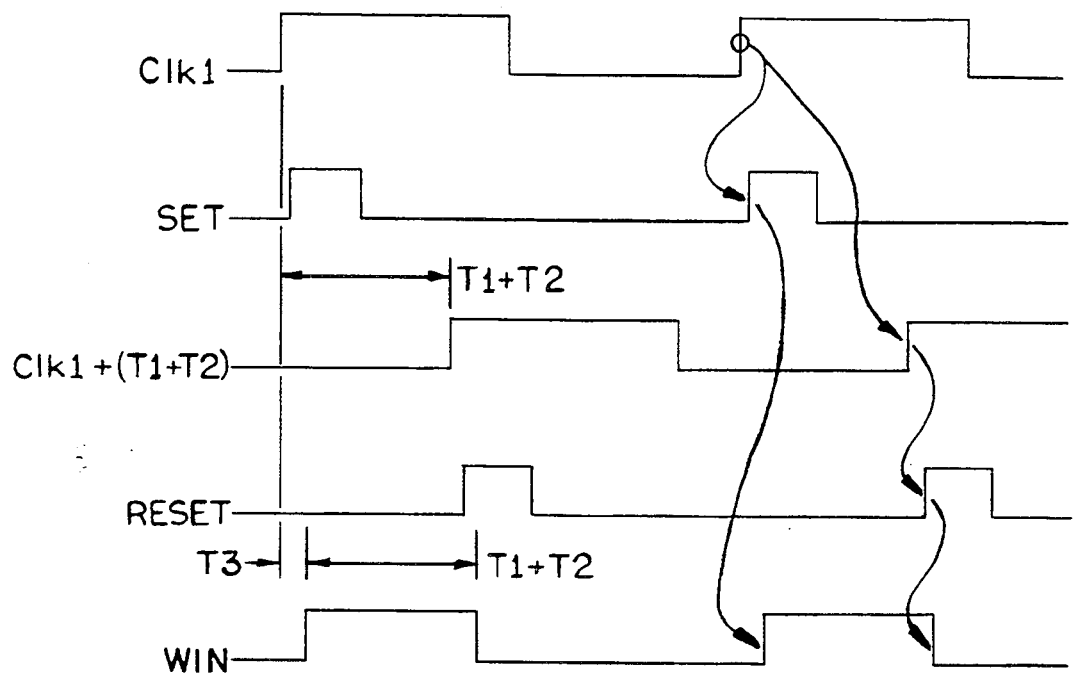
FIG. 10 is a timing diagram showing the development of the WIN signal derived from CLK1.

FIG. 10 explains the operation of the one-shot 52 (FIG. 5) which generates WIN. The rising edge of CLK1 triggers the pulse SET by means of a pulse generator 60 which includes three inverters 62 to invert and delay the input signal In and thereby generate In2 for an AND gate 64. The other AND gate input is taken directly from CLK1. When SET goes high, the output of the SR flip-flop 66 (WIN) goes high. To develop the RESET pulse, twelve inverters 68 delay CLK1 by an amount T1+T2 to produce an output which triggers another pulse generator 70 the output of which is the RESET pulse. When RESET goes high, WIN goes low. Every rising edge of CLK1, the one-shot 52 generates a WIN pulse of width T1+T2, delayed by T3.

Figure 11:
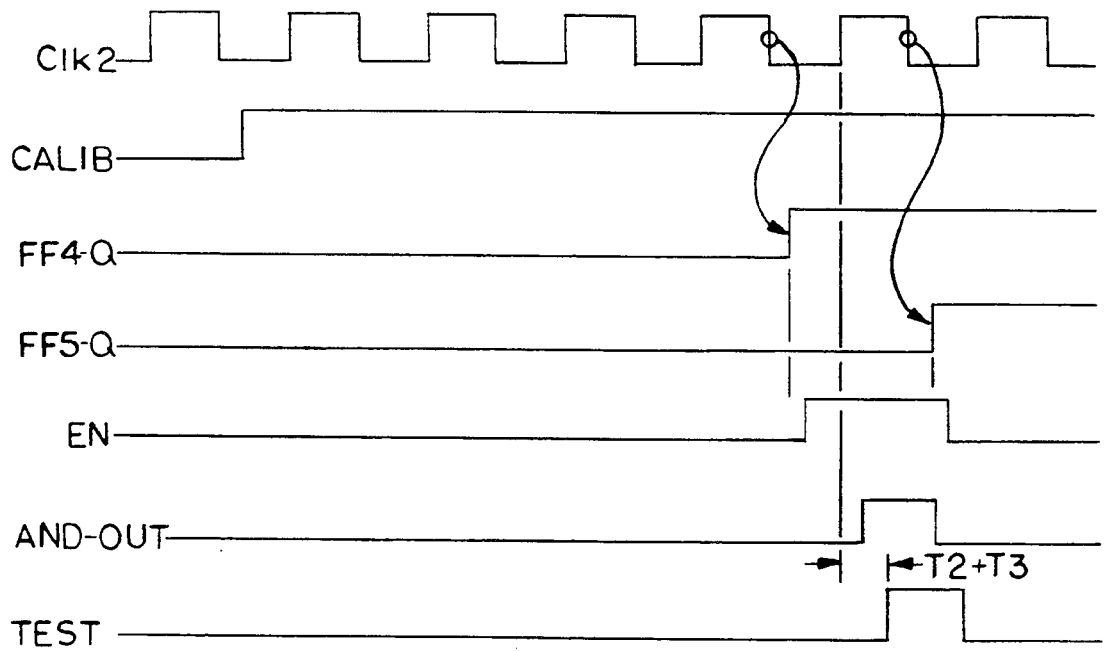
FIG. 11 is a timing diagram showing the development of the TEST signal derived from CLK2.

FIG. 11 explains the development of the TEST pulse previously described. A chain of flip-flops FF1 to FF5 (FIG. 5) are clocked by an inverted version of CLK2, i.e., they are clocked on the falling edge of CLK2. Upon command, the signal CALIB goes high and is clocked down through this chain of flip-flops. The transitions of the outputs of FF4 and FF5 are combined to create a gating pulse EN. This pulse is supplied to an AND gate 72 together with CLK2 to allow one rising edge of CLK2 to pass through the AND gate to produce AND-OUT. This rising edge of CLK2 is delayed by an amount T2+T3 to become the TEST signal at the clock input of the Test flip-flop 50.

It will be seen from the above that when a low-to-high transition of the CALIB signal generates the TEST signal, the Test flip-flop 50 makes a decision on the timing of CLK1 relative to CLK2. If the output of the Test flip-flop goes high, CLK1 was inside the forbidden window 42, and if the output is low, CLK1 was outside the window. The output of the Test flip-flop is clocked into FF11. If the output of the Test flip-flop goes high, the toggle signal output of FF11 will also go high, to invert CLK2. If CLK2 is inverted by the calibrator 40, it remains inverted for the rest of normal operation for the IC chip.

In some applications, it may be desirable to take into account the setup and hold time requirements for the Test flip-flop 50. That is, because there is no guarantee that the WIN pulse will occur at a time satisfying any setup and hold requirements of the flip-flop 50 relative to the TEST signal, there is a finite probability that the output of the Test flip-flop will enter a meta-stable state so as to prolong the propagation time within the flip-flop. To avoid such a result, the output of the Test flip-flop is clocked into FF11 by the output of FF10, i.e., by the EN pulse delayed by five CLK2 cycles resulting from clocking EN through a chain of five flip-flops FF6-FF10. The probability that the output of the Test flip-flop would remain meta-stable for such a long time is exceedingly small. This delay therefore reduces to an insignificant level the probability that the decision made by the calibrator 40 is incorrect.

For further assurance of reliable performance, the width of the forbidden window 42 may be increased somewhat beyond the theoretical T1+T2 width described above. This will give a further safety margin against errors in the delay chains that generate the TEST and WIN signals.

Although a preferred embodiment of the invention has been disclosed herein in detail, it is to be understood that this is for the purpose of illustrating the invention, and should not be construed as necessarily limiting the scope of the invention since it is apparent that many changes can be made by those skilled in the art while still practicing the invention claimed herein.

What is claimed is:

1. A calibrator for monitoring first and second synchronous clock signals controlling the input to a receiving device and for producing an output signal whenever one of the clock signals occurs within a forbidden time window with respect to the other clock signal, said time window being at least equal to a setup time and a hold time for said device, said calibrator comprising:
   first pulse-generating means responsive to said first clock signal for producing a window pulse having a duration at least as wide as said forbidden time window;
   said first pulse-generating means comprising a set-reset flip-flop wherein the set input is coupled to the output of a pulse generator activated by said first clock pulses;
   the reset input of said flip-flop being coupled to the output of a pulse-generator activated by said first pulses through a delay means corresponding to at least said setup and hold times, thereby to control the time duration of said window pulse:
   second pulse-generating means responsive to said second clock signal for producing a test pulse at a specified time delay after said second clock signal, said specified time delay including said hold time; and
   means responsive to said window and test pulses for producing said output signal when said test pulse is activated during the time of said window pulse.

2. Apparatus as claimed in claim 1, wherein said first pulse-generating means comprises a set-reset flip-flop wherein the set input is coupled to the output of a pulse generator activated by said first clock pulses;
   the reset input of said flip-flop being coupled to the output of a pulse-generator activated by said first pulses through a delay means corresponding to at least said set up and hold times, thereby to control the time duration of said window pulse; and
   said second pulse-generating means comprising a time-delay means responsive to said second clock signals and operable to produce said test pulse.

3. Apparatus as caliemd in claim 2, wherein said time-delay means delays said test pulse by a time period which includes said hold time.

4. Apparatus as claimed in claim 3, wherein the leading edge of said window pulse is delayed by a predetermined time period (T3);
   said test pulse delay means being operable to delay said test pulse by a time corresponding to said hold time and to said particular time period.

5. A calibrator for monitoring first and second synchronous clock signals controlling the input to a register and for producing an output signal whenever one of the clock signals occurs within a forbidden time window with respect to the other clock signal, said time window being at least equal to a setup time and a hold time for said device, said calibrator comprising:
   first pulse-generating means responsive to said first clock signal for producing a window pulse having a duration at least as wide as said forbidden time window;

second pulse-generating means responsive to said second clock signal for producing a test pulse at a specified time delay after said second clock signal, said specified time delay including said hold time;

means responsive to said window and test pulses for producing said output signal when said test pulse is activated during the time of said window pulse; and means responsive to power-up of the apparatus incorporating said registering to activate said calibrator upon such power-up.

6. A calibrator for monitoring first and second synchronous clock signals controlling the input to a register and for producing an output signal whenever one of the clock signals occurs within a forbidden time window with respect to the other clock signal, said time window being at least equal to a setup time and a hold time for said device, said calibrator comprising:

first pulse-generating means responsive to said first clock signal for producing a window pulse having a duration at least as wide as said forbidden time window;

second pulse-generating means responsive to said second clock signal for producing a test pulse at a specified time delay after said second clock signal, said specified time delay including said hold time;

means responsive to said window and test pulses for producing said output signal when said test pulse is activated during the time of said window pulse;

said means responsive to said window and test pulses having setup and hold time requirements which should be met to assure that said output signal thereof is valid;

means responsive to said output signal and to a control signal for producing a toggle signal to effect a change in timing of one of said clock signals when said output signal goes high; and means to delay application of said control signal to said responsive means to provide sufficient time to enable said output signal to reach a valid state if the setup or hold time requirements of said means responsive to said window and test pulses are not met.

7. Apparatus as claimed in claim 6, wherein said means responsive to said window and test pulses is a Test flip-flop clocked by said test pulses.

8. Apparatus as claimed in claim 7, wherein said means responsive to said output signal is a flip-flop the output of which is said toggle signal.

* * * * *